Nov. 20, 1951     A. F. VON SODEN     2,575,570
MULTIPLE SOUND RECORDING AND REPRODUCING APPARATUS
Filed May 15, 1948
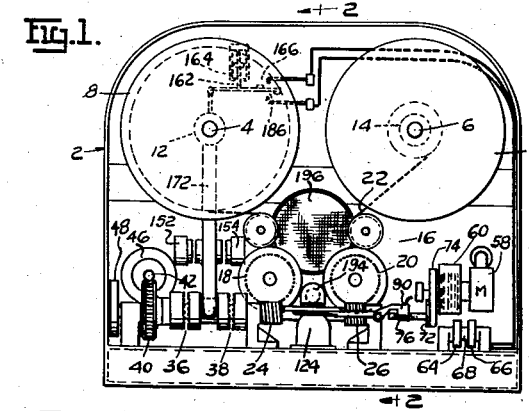
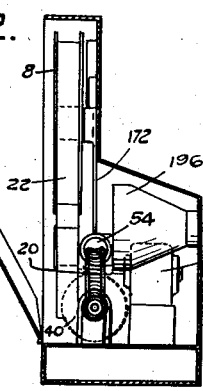
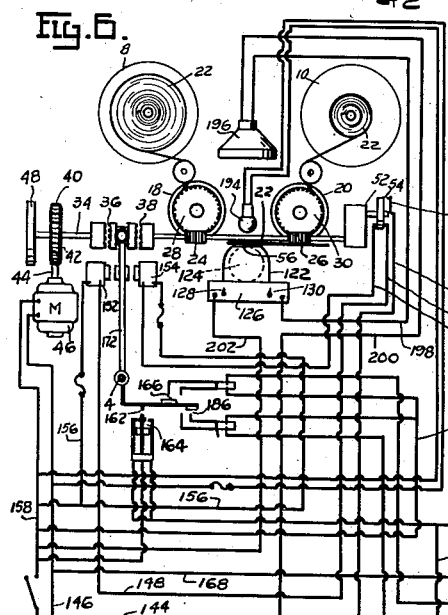
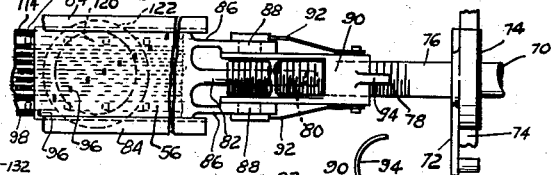
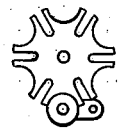
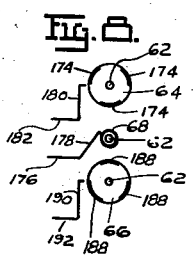
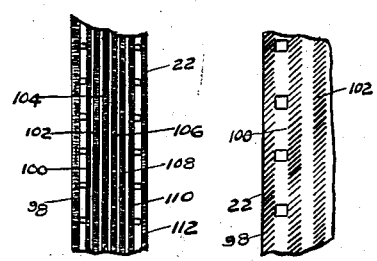
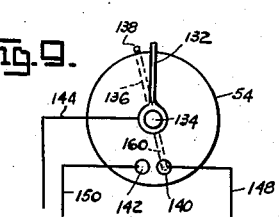
INVENTOR Patented Nov. 20, 1951

2,575,570

UNITED STATES PATENT OFFICE 2,575,570

MULTIPLE SOUND RECORDING AND REPRODUCING APPARATUS

Adolph F. von Soden, Los Angeles, Calif.

Application May 15, 1948, Serial No. 27,203

2 Claims. (Cl. 179—100.3)

My invention relates to sound on film recording and sound reproducing apparatus, and more particularly to devices adapted for providing a sound track in a multiple spaced relation upon the entire width of a film surface, during the reciprocally movable film passing from one reel to another, and means for reproducing said sound therefrom.

Accordingly an object of my invention is to provide an apparatus having suitable means for housing a roll of film therein, also, said apparatus having means for winding and re-winding said roll of film from one spool upon the other, and in addition, said apparatus having a specially constructed aperture carrier means for automatically adjusting the sound track aperture from one space to another and each time said film is wound or re-wound upon or from the respective film spool, whereby a continuous sound on film may be recorded and also reproduced therefrom, during the operation of said apparatus.

A further object of my invention is to provide said apparatus with a suitable sound aperture carrier means which is closely associated with the film surface and adapted for maintaining continually said aperture over the sound track during the film passage from one reel to another, and during the winding and re-winding operation thereof.

Another object of my invention is to provide said sound aperture carrier means of said apparatus with a manually operable play-back means, adapted for re-adjusting said aperture over any required sound track disposed in a spaced relation thereon and without interrupting the film feed passing therethrough.

A further object of my invention is to provide said apparatus with suitable controlling means for controlling the position of said aperture carrier means during the process of winding said film from one spool upon the other, and in addition, said apparatus having means for controlling the winding and re-winding of said film, at required speed, during the operation of said apparatus.

My invention also has for its objects to provide such means that are positive in operation, convenient in use, easily installed in a working position and easily disconnected therefrom, economical in manufacture, relatively simple, and of general superiority and serviceability.

Other and further objects and advantages of my invention as will hereinafter more fully appear, I attain by the construction herein shown on the drawings and described in the specification, forming a part of my application.

Reference is had to the accompanying drawings, in which the similar characters denote the same parts.

In the drawings:

Fig. 1 shows the front elevational view of the apparatus, with the front cover removed.

Fig. 2 is a vertical sectional view thereof, taken on the line 2—2 of Fig. 1.

Fig. 3 is a fragmentary elevational view of the film, showing a plurality of sound tracks imprinted thereon in a multi-spaced relation.

Fig. 4 shows a fragmentary top view of the aperture carrier member, connected to a space controller member of the apparatus.

Fig. 5 shows a fragmentary side elevational view thereof, taken from the bottom of Fig. 4.

Fig. 6 shows the wiring diagram of the apparatus.

Fig. 7 shows the front elevational view of the sound track aperture changer.

Fig. 8 shows the side views of the film direction controlling discs and their respective electrical contact members.

Fig. 9 shows the front view of the film reverse control disc, with the electrical contact members.

Fig. 10 shows a fagmentary elevational view of the film, showing the sound tracks in modified form.

Fig. 11 shows a fragmentary front view of the film disclosing sound track in slanted position, and showing the same in another modified form.

Describing my invention more in detail, in its broader aspects, said invention comprises a housing 2 having a pair of film reel bearings 4 and 6, on which suitable film reels 8 and 10 are mounted, each bearing 4 and 6 having a suitable pulley 12 and 14 provided with a spring belt member 16 which connects with film drive sprockets 18 and 20, for synchronizing the speed of the film moving parts 8, 10, 12, 14, 18 and 20, respectively, when the film 22 is held in an engaged position and passes from said reel 8 unto said reel 10, in a forward or in reverse direction.

Said drive sprockets 18 and 20 are provided with suitable worm gears 24 and 26, each having an engaging drive worm members 28 and 30 respectively, which are mounted upon a common shaft 34, on which suitable drive clutch members 36 and 38 are mounted, also, having a drive worm gear 40 mounted thereon, which is driven by a worm 42 connected to a motor shaft 44 operable by a motor member 46, and in addition having a stabilizing fly wheel member 48 mounted thereon, as shown in Figs. 1 and 6.

The shaft extended end 50 is connected to a speed reduction gear mechanism 52 which is provided with a film reversing control member 54, the operation of which will be presently described.

Also, said apparatus is provided with an aperture carrier and control device 56, comprising a motor 58 having a gear reduction member 60 provided with a shaft member 62 which extends therefrom and on which a pair of timing discs 64 and 66 are mounted, having therebetween a contact roller 68, as shown in Figs. 1, 6 and 8.

Said gear reduction member 60 is also provided with an extended shaft 70 on which an actuating member 72 is mounted, and which is held in an engaging position with a timing gear 74, as shown.

A shaft member 76 extending from said timing gear 74 is provided with suitable thread 78, the extended end of said shaft 76 having a locating or guiding hole 80 in which a guide rod 82 is slidably positioned, and which extends from and connects with said aperture carrier member 56.

Said aperture carrier member 56 is held in slidable position between a pair of guides 84, and is also provided with a pair of extensions 86 each having a suitable bearing member 88 on which the control block 90 is hingedly mounted and held in an engaging position against said threads 78 by means of suitable pressure spring members 92, as shown in Figs. 4 and 5.

In order to change the position of said aperture carrier, said control block 90 may be pivoted upwardly by means of a lifting extension 94, and thereby allowing said carrier 56 to be set into any desired position and over the film 22 passing thereunder.

Said aperture carrier 56 is provided with a plurality of slits 96, each of which is placed in a diagonally advanced position, as shown in Fig. 4, and each slit, in position, corresponds to the respective sound track 98, 100, 102, 104, 106, 108, 110, 112 and 114, disposed upon said film 22, as shown in Figs. 3 and 4, or, the number of said slits 96 may be so arranged, whereby the corresponding sound tracks on said film, see Fig. 10, may be accommodated.

As shown on Fig. 3, there are nine sound tracks, each sound track being of one cm. in length and utilizing the entire width of said film 22 which is 16 mm., whereas, as shown in Fig. 10 the number of sound tracks are eight, an even number of sound tracks will allow the entire film length to be wound upon the main spool, without rewinding of the same, when the end thereof is reached, and during the operation of the apparatus.

In order to provide a differential of sound track apertures of said carrier 56 and in respect to the sound track on the film 22, a controlling slit 120 is provided in the sound housing 122, see Fig. 4, whereunder a suitable photo electric cell 124 is mounted, having an amplifier 126 provided therein, having a suitable volume control 128 and a tone control 130 associated therewith, as shown in Fig. 6.

Said controlling slit 120 is held in a stationary position, the film 22 passing thereover from one film spool to another, while said slit 96 in said aperture carrier 56 is held over said film and over the respective sound track and in line with said slit 120, so that when starting at said sound track 98, said film passing in one direction and the end thereof is reached, then the partial rotation of said timing gear 74 will cause said carrier 56 to move and allowing the second slit 96 to line-up with said slit 120, thereby exposing the second sound track 100 on said film, whereupon the direction of said film is reversed and rewound upon the respective film spool.

In this manner the film 22 is wound and rewound alternately, and the carrier 56 is moved correspondingly and allows said slit 96 of each respective sound track on said film to move progressively, until the last sound track is reached during the operation of said apparatus.

The timing of said film end is accomplished by the gear mechanism 52, in which said reversing control member 54 makes one revolution for every film length passing through said apparatus, said length corresponding to the length of the sound track, while the film leader ends hold the film ends on their respective spools.

Said gear mechanism 52 is provided with a timing finger 132 which is rotatably mounted and operable with the shaft 134 and is disposed upon one side of said control member 54 which is stationarily positioned.

At the opposite side of said control member 54 a follower contact member 136 is mounted, which operates pivotally on said shaft 134, having one end thereof provided with an engaging extension 138, adapted for engaging the extended end of said timing finger 132, while the downwardly extending end makes a contact with the contact buttons 140 and 142, as shown in Fig. 9.

Said timing finger 132 is connected to a lead wire 144 which leads to and connects the electrical current supply wire 146, also, the right contact button 140 is provided with a lead wire 148 and the left contact button 142 is connected to a second lead wire 150.

The lead wire 148 leads to and connects with a left solenoid 152, and the lead wire 150 connects with the right solenoid 154, each solenoid having lead wires 156 leading to and connecting the electric current supply line 158.

When said film 22, passing from one spool to another reaches the end of said sound track, said timing finger 132 moves approximately one revolution, the end of which comes in contact with said engaging end 138 causing the lower end thereof to pivot, which movement changes the position from the right button 140 to the left button 142.

When said right button 140 is connected, then the electric current is allowed to pass from the supply line wire 146 into the lead line 144, then through the follower member or extension 160, making a contact with said button 140, and then causing said electrical current to flow through the wire 148 which leads to said left solenoid 152, passing through the lead wire 156 and finally the wire 158, thus causing the clutch 36 to become engaged which reverses the direction of said film 22, from one spool unto another.

Simultaneously, a contact interrupter 162 in engaging the starter contact points 164, causes the contact points 166 to be closed.

Before said contact points 166 are closed, said interrupter 162 causes the electric current to pass from said line 146 into the lead line 168 and the motor 58, then flowing through the line 170 and said interrupter 162 and finally into the line 158, for completing the circuit.

In operation, said interrupter 162 and said starter contact points 164 are actuated momentarily, allowing only enough time for the electric current to pass into and start the said motor 58 and causing said shaft 62 to turn, and at the same time, the pivoting movement of the clutch arm 172 causing the contact points 166 to close.

During the turning motion of said disc 64, a contact is established with one of the timing segment plates 174, see Fig. 8, allowing the electrical current to pass through the lead wire 168 and said motor 58, and also through the wire 170, and since said points 164 are in open position, then said electric current is caused to flow through wire 176 leading to the contact plate 178 then through said roller 68 and the timing plate 174, also through a contact finger 180 leading to a wire 182 which connects with said closed contact points 166, and finally said current flows through a lead wire 184 which connects with said line 158.

Said disc 64 will turn until said finger 180 will reach the end of said segment plate 174, and through which said electrical contact has been established.

Also, during the rotation of said disc 64, said shaft 70 of said gear reduction member 60 will make one complete revolution, causing said actuating member 72 to move said timing gear 74 one section thereof, and the partial revolution of said timing gear and said shaft 76 causes said aperture carrier device 56 to slide, which action causes one of said slits 96 to be placed in line with said photo cell controlling slit 120, and also in line with the respective sound track on said film 22.

Since no more of said electrical current can pass, through said disc 64 because the contact is broken, then said motor 58 will stop, until again becomes energized, and which occurs when the end of the sound track on said film 22 is reached, in which case said clutch 38 closes by the action of said film reversing control member 54, as hereinbefore described, and again said interrupter 162 engages said contact points 164 and causes the contact points 186 to close, by the pivotal action of said clutch arm member 172.

When said contact points 186 are closed, then the electrical current will flow through said wire 168 thus energizing said motor 58, allowing said current to pass through the lead line 176 and the contact plate 178, allowing said current to flow through said roller 68 and then said timing disc 66, then through one of the timing segment plates 188 and the finger member 190, also through the wire 192 and the closed points 186, and finally through said wire 184 connecting said line 158, to complete the circuit.

The rotation of said disc 66 will continue until said finger member 190 will reach the end of said segment plate 188, through which the contact has been established, and in the mean time said actuating member 72 will make one complete revolution causing said timing gear 74 to turn one section, causing said aperture carrier 56 to move, and the movement thereof causing the next slit 96 to be lined-up with said controlling slit 120 and also lining-up the respective sound track on said film 22.

Said thread 78 on said shaft member 76 is of suitable pitch, including the thread of said control block 90 which is held in mesh with said thread 78 during the operation of said apparatus, so that the one section turn of said timing gear 74 which is a partial turn of said shaft member 76, will slide said aperture carrier 56 for alignment of the proper slit 96 with said photo cell controlling slit 120 and the respective sound track on said film 22.

Also, for the operation of the apparatus a suitable lamp member 194 is provided which is energized in a conventional manner by means of said electric current passing through said lines 146 and 158, said lamp 194 is positioned directly above said aperture carrier 56 allowing said photo electric cell 124 to be energized and causing the electric current in variable intensity to pass through said amplifier 126 to which a suitable loud speaker 196 is connected by means of a lead wire 198, and also having a connecting wire 200 which connects with the line 146, while said amplifier 126 is provided with a wire 202 which connects with said line 158, to complete the electric circuit.

It may readily be noted, that by providing suitable electric recording circuit, known in the art, and by employing the invention herein described, which is the aperture carrier 56 and the component parts thereof for alignment of said slits 96 and said controlling slit 120, said multiple sound track 98 to 114, or any other combination of sound tracks, as shown in Fig. 10, which is eight in number, may be recorded.

Also, it may be noted that suitable delay-relay devices, speed regulators, speed controller and timing devices may be used and substituted for the component parts herein described, without departing from the scope of the foregoing invention. Therefore, while I have thus described my invention with great particularity, it will be clear that the same may be modified throughout a wide range.

I accordingly do not propose to be limited to the exact details of construction herein shown on the drawings and described in the specification, but reserve the rights in practice to make the necessary changes and modifications therein, which may come within the scope of the appended claims.

I claim as my invention:

1. In a sound film reproducing apparatus of the class described comprising a housing, a pair of film spools in said housing, means in said housing for reeling a film from one spool to another in an alternate rotation, means in said housing for guiding said film when in position, a stationary controlling slit disposed transversely across the face of said film, an aperture carrier in said housing having a plurality of aperture slits therein positioned over said film and disposed to move laterally thereover for superimposing said apertures over said transversely disposed stationary controlling slit, timing controlling means in said housing for controlling the position of said aperture carrier over said film and over said stationary controlling slit and in respect to the multiplicity of sound tracks on said film, a source of light in said apparatus disposed in close proximity to said film and over said stationary controlling slit and said aperture carrier, a photo-electric cell in said apparatus disposed under said stationary controlling slit for receiving light variations passing through said sound tracks of said film, and means in said apparatus for laterally and progressively actuating and directing said apertures of said aperture carrier over said stationary slit in accordance with said timing controlling means and when said film reaches its end reeling from one spool to another, during the operation of said apparatus.

2. In a sound from film reproducing apparatus of the class described, comprising a housing, a pair of spools mounted in said housing for holding a film thereon, a plurality of sound tracks on said film, a stationary slit in said housing disposed transversely across the face of said film, in combination with a film reversing control for reeling said film from one spool to another, a pair of timing discs in said film reversing control for directing the flow of electrical current into the driving member of said apparatus when said film reaches the sound track end in reeling from one spool to another, an aperture carrier in said apparatus disposed over said film and having a plurality of aperture slit therein for superimposing each respective aperture slit over the sound track on said film and over said stationary slit in said housing, a timing gear connecting said aperture carrier, an actuating member for turning said timing gear in relation to said pair of timing discs in said film reversing control, and means in said aperture carrier and said timing gear for regulating the position of said plurality of aperture slits when disposed over said sound tracks of said film and said stationary slit in said housing, substantially as described.

ADOLPH F. von SODEN.

REFERENCES CITED

The following references are of record in the file of this patent:

UNITED STATES PATENTS

| Number | Name | Date |
|---|---|---|
| 1,802,595 | De Forest | Apr. 28, 1931 |
| 1,950,090 | Owens | Mar. 6, 1934 |
| 2,069,631 | Thomas | Feb. 2, 1937 |
| 2,088,451 | Thomas | July 27, 1937 |
| 2,091,688 | Owens | Aug. 31, 1937 |
| 2,215,468 | Herzig | Sept. 24, 1940 |